May 18, 1965 J. A. MILLS 3,183,782
MACHINES HAVING A MOVABLE WORK OR TOOL SUPPORTING TABLE
Filed June 26, 1961 2 Sheets-Sheet 1
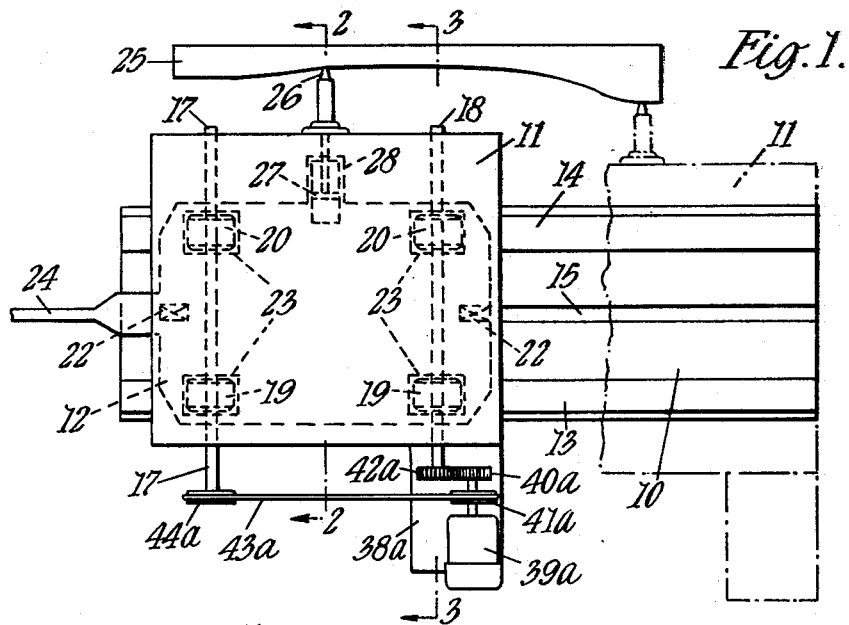
Fig.1.
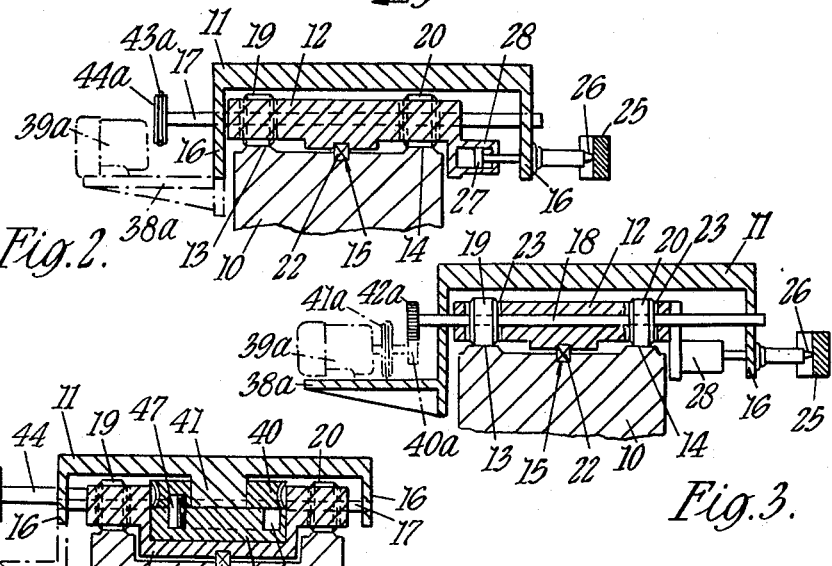
Fig.2.
Fig.3.
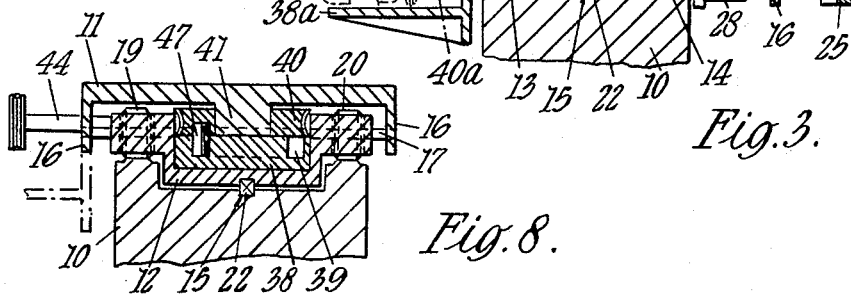
Fig.8.

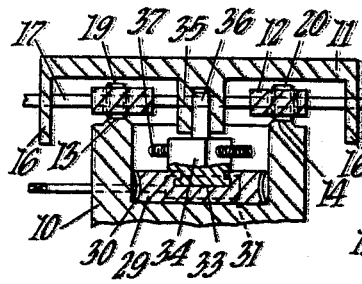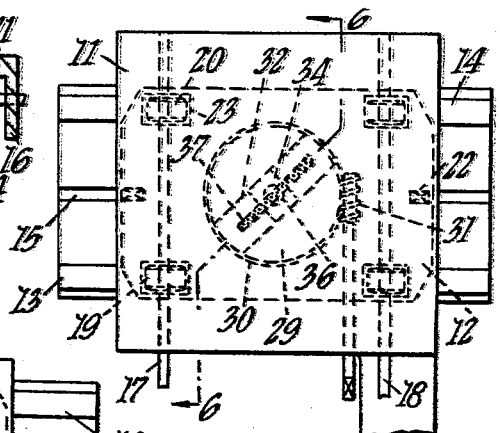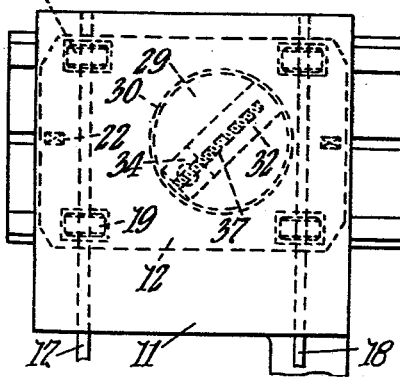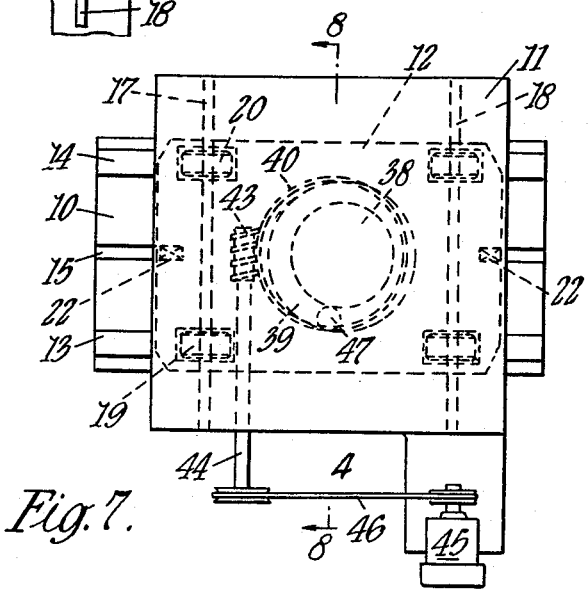

United States Patent Office 3,183,782
Patented May 18, 1965

3,183,782
MACHINES HAVING A MOVABLE WORK OR TOOL SUPPORTING TABLE
John Alfred Mills, 24 Kingsley Ave., Melton Park, North Gosforth, Newcastle-upon-Tyne, England
Filed June 26, 1961, Ser. No. 119,725
Claims priority, application Great Britain, June 27, 1960, 22,381/60; Apr. 18, 1961, 13,907/61
2 Claims. (Cl. 90—58)

This invention has reference to machines having a movable work or tool supporting table.

Such machines include, for example, metal working machines, gauging machines, wood working machines and the like.

Many metal working machines are provided with a fixed supporting bed and a table which can be traversed on said bed, the direction of traverse being fixed.

One object of the invention is to provide improvements in such machines whereby the table, while being so supported that it has substantially no play, can be traversed in any direction either in straight or curved paths, or in a combination of such paths, while still maintaining parallelism of the table to a fixed reference.

Such machines include, for example, metal working machines but may be applied, for example, to wood working machines, to gauging machines and to other machines having a horizontal or substantially horizontal table for carrying the work or the tool or implement and mounted for movement on a fixed bed or support.

According to the present invention a machine having a bed and a table to travel thereon in any path while maintaining parallelism to a fixed reference is provided with a sub-table having rollers mounted thereon which travel on the bed, means constraining the sub-table to travel in a fixed path over the bed, and at least two shafts carried by the subtable and extending transversely of the fixed path, the shafts being capable of axial sliding movement with respect to the sub-table and the table being secured to and supported by the shafts to move therewith, the construction being such that the table can be traversed in any path while maintaining parallelism to a fixed reference, the rollers running on the bed, or the shafts moving axially relative to the sub-table or the rollers and shafts simultaneously partaking of such movements, depending on the path of traverse.

The rollers may be mounted on the shafts, the shafts being capable of axial sliding movement relative to the rollers.

The invention will be described with reference to the accompanying drawings which show various embodiments of the invention wherein:

FIGURE 1 is a plan view of a machine in accordance with the invention, the chain dotted lines indicating the position of the table at one end of a traverse movement;

FIGURE 2 is a section on the line 2—2 of FIGURE 1;

FIGURE 3 is a section on the line 3—3 of FIGURE 1;

FIGURE 4 is a plan view of an alternative construction of machine in accordance with the invention;

FIGURE 5 is a view corresponding to FIGURE 4 but showing the table in a different position;

FIGURE 6 is a section on the line 6—6 of FIGURE 4;

FIGURE 7 is a plan view of a still further construction of machine in accordance with the invention; and FIGURE 8 is a section on the line 8—8 of FIGURE 7.

In the drawings 10 denotes the bed of a machine, 11 denotes the table and 12 denotes a sub-table or frame in parallelism to a fixed reference, e.g. the side of the bed.

In all embodiments of the invention illustrated the bed is provided with horizontal parallel guide tracks 13 and 14 positioned at the sides thereof and is further provided with a keyway 15 positioned centrally of and extending parallel to the guide tracks.

The table is provide with side flanges 16 and secured to the flanges are transversely extending shafts 17 and 18, the shafts being positioned in proximity to the ends of the table. Free on each shaft and resting on the guide tracks are two rollers 19 and 20. The shafts support the table and the rollers support the shafts.

Interposed between the table and bed is the frame or sub-table 12 which has tenons 22 on its under face, the tenons fitting into and being guided by the keyways 15. The sub-table has four rectangular holes 23 in which fit the rollers 19 and 20. The shafts extend through transverse bores in the sub-table or frame. It will thus be seen that the sub-table by reason of the interfitting tenons and keyway can be transversed in one path only and that the sub-table when being traversed constitutes a guide for the shafts and their rollers. The shafts can partake of an axial movement, that is a movement at right angles to the traverse movement, the table then partaking of a like movement.

It will be seen that when the sub-table is traversed longitudinally the rollers will roll along the tracks and the table will be traversed therewith. Further the table can be moved in a plane at right angles to the line of such traverse, the shaft then moving axially through the rollers which latter will not then rotate, or the table may be moved in a path which is parallel neither to the tracks nor to the axles, the rollers running on their tracks and the axles passing freely through the rollers. Thus the table can be traversed in any path but by reason of the guided sub-table it always retains parallelism with the keyway 15 which constitutes a fixed reference.

In the machine shown in FIGURES 1 to 3 the sub-table 12 is traversed longitudinally of the bed by means of a power-operated connecting rod 24. It will be understood that any form of power may be used and transmitted to the sub-table by any suitable means. Alternatively the sub-table may be manually traversed.

Adjacent to one side of the table is a cam track 25 which has a contour suitable for the path in which it is desired to move the table. Co-operating with said track is a cam follower 26 which is carried by the table, and maintaining the cam follower in contact with the cam track is a spring biased plunger 27 supported by a casing 28 and bearing on the inner face of the flange 16 adjacent to said track.

It will thus be seen that the sub-table can be traversed from end to end of the table, the rollers then rolling on their tracks. During such movement the table can partake of a further movement at right angles thereto.

Thus while the table is maintained in parallelism with the fixed reference, i.e. the keyway 15, it can be traversed longitudinally of the bed and, depending on the formation of the cam track, moved in any path over the bed.

Referring again to the construction shown in FIGURES 1 to 3, it will be seen that the table 11 is provided with a platform 38a on which is mounted a motor 39a. On the shaft of the motor is a spur wheel 40a and also a pulley 41a. The spur wheel meshes with a second spur wheel 42a fast on the shaft 18 and the pulley 10 through a V-belt 43a or other means drives a pulley 44a fast on the shaft 17. The two shafts are journalled in bearings carried by the side flanges of the table but it will be understood that the shafts cannot move axially relative to the table.

To overcome any static friction resisting the rotation of the rollers the motor 39a is switched on prior to traversing the table whereby the two shafts 17 and 18 are rotated through the intermeshing gear wheels and the bolt and pulley drive. Immediately the shafts are rotating the table can be traversed, there being no static friction resisting the rotation of the rollers on their shafts. The table will therefore move smoothly without any sudden jerk. It can be moved to any pre-selected position and stopped without over-riding. Should the table be reciprocated the motor will either be kept running or started again prior to be reversed. Should the table be moved continuously in a closed path at a slow speed it is preferred to keep the motor running.

It will be noted that one shaft is rotated clockwise and the other anti-clockwise so that there will be no tendency of the table moving under the action of the rotating shaft.

Where there are intermediate shafts they are likewise rotated to break down the static resistance to the rotation of the rollers thereon.

Said motor may be switched on automatically prior to the power means for traversing the table coming into operation, and a switch may be provided to cut out said motor after the table has commenced to move.

In the machine shown in FIGURES 4 to 6 the bed has a horizontal rotatably mounted circular member 29 positioned centrally thereof, the periphery of said member being cut to form a worm wheel 30. Meshing with the worm wheel is a manually rotatable worm 31. The upper face of the worm wheel has a diagonally extending track 32 and fitted to slide therein is the foot of a driving member or slide 33 provided with a feed nut 34 and above the feed nut a vertical pin 36. The pin fits into a boss 35 on the underside of the table.

Engaging the feed nut is a feed screw 37 which may be rotated manually or by a motor.

The worm wheel 30 can be rotatably adjusted by means of the worm so that the diagonally extending track is parallel with or at any desired angle to the keyway 15, the feed screw being adjusted therewith to lie in the line of the diagonal track.

When the said track and feed screw are parallel with the keyway rotation of the feed screw will result in the table travelling in a path parallel to the keyway while retaining parallelism to the keyway. The rollers 19 and 20 then run on the tracks 13 and 14 and the shafts 17 and 18 partake of no axial movement relative to their rollers. If now the worm wheel is rotated so that its diagonal track extends at right angles to the keyway rotation of the feed screw imparts to the table a movement in a path transverse to the keyway. The rollers do not then rotate and the shafts move axially relative thereto. When the rotary member is adjusted so that its track is at any other angle the table will partake of a like movement, the rollers running on their tracks and the shafts moving axially relative to the roller. Irrespective of the path in which the table is moved the frame or sub-table 12 ensures that it maintains parallelism to the keyway.

In the construction shown in FIGURES 7 and 8 the frame or sub-table 12 is provided with a non-rotatable member 38 having a cam track 39. Mounted on this member is a worm wheel 40 rotatable about a boss 41 on the underside of the table. Meshing with the worm wheel is a worm 43 on a shaft 44 which is driven by a motor 45 through a belt or other drive 46. The motor is mounted to travel with the table. Projecting from the underside of the worm wheel is a pin 47 which constitutes a cam follower engaging with the cam track 39.

It will be appreciated that when this member 38 is rotated the co-operation of the cam follower with the track will result in movement being transmitted to the table. The movement of the table relative to the bed will, of course, depend on the formation of the cam track. Thus part of its travel may be longitudinally of the bed, the rollers then running on the tracks and the shafts partaking of no axial movement relative to the rollers. During another part of its travel the table may move at right angles to the longitudinal movement, the rollers then remaining stationary and the shafts moving axially. Other parts of its travel may be in a direction which is constantly varying or which is at an angle to both of such directions. When so moved the rollers roll on their tracks and the shafts partake of an axial movement relative to the rollers.

Although the various embodiments shown in the drawings are provided with only two shafts 17 and 18 it will be understood that the table may be provided with one or more intermediate shafts each having rollers mounted thereon and likewise capable of axial movement relative to the shafts. Further the number and disposition of the rollers may be varied as may be desired in order to give adequate support to the table.

The table may be provided with two rollers at one end and a single centrally positioned roller at the other end.

Anti-friction bearings may be introduced between the shafts and the rollers such anti-friction bearings being, in preference, in the form of sleeves having incorporated therein a multiplicity of balls which permit easy axial movement of the shafts relative to the rollers and the rotation of the rollers on their shafts.

Anti-friction bearings are also provided between the frame or sub-table and shafts.

It will be understood that the table is surrounded by a suitable tool which works on the work piece carried by the table. In lieu of a tool a gauge may be provided. Alternatively the table may carry the tool.

Similar means are applied to the other arrangements described for rotating the shaft on which the rollers are mounted.

What I claim is:

1. In a machine having a bed, spaced parallel tracks on said bed, a sub-table, rollers mounted on said sub-table and engaging said tracks to support said sub-table for movement longitudinally of said bed, co-operating means on said sub-table and bed to guide said sub-table in a fixed longitudinal path of movement, at least two spaced shafts slidably mounted on said sub-table for movement tranversely of said fixed longitudinal path of movement, the said shafts extending through said rollers to mount the same on said sub-table, said rollers being freely rotatable with respect to said shaft and the said shafts being freely slidable with respect to said rollers, a table directly supported by said shafts and movable therewith whereby said table and sub-table may move in said fixed longitudinal path of movement, or said table may move transversely of said fixed longitudinal path of movement with said sub-table stationary, or said table may move in a path which is the resultant of movement of said sub-table in said fixed longitudinal path of movement and movement of said table transversely of said fixed longitudinal path of movement and means provided for positively rotating said shafts to overcome static friction between said rollers and said shafts.

2. In a machine as defined in claim 1, in which means is provided for positively rotating one shaft in one direction and for positively rotating the other shaft in the opposite direction, whereby any movement of said carriage by reason of the rotation of said shafts is prevented.

References Cited by the Examiner

UNITED STATES PATENTS

| 281,510 | 7/83 | Hope | 90—13.3 |
|---|---|---|---|
| 1,044,816 | 11/12 | Phillipson | 143—52 |
| 2,253,095 | 8/41 | Rothweiler | 90—13.1 |
| 2,445,676 | 7/48 | Lasar | 143—113 X |
| 2,449,252 | 9/48 | Rothweiler | 90—13.1 |
| 2,518,159 | 8/50 | Martin | 308—183 |
| 2,707,321 | 5/55 | Breisch | 90—13.5 X |
| 2,835,288 | 5/58 | Jones | 143—52 X |
| 2,866,390 | 12/58 | McCadden | 90—13.4 |
| 3,046,822 | 7/62 | Von Zelewsky | 90—62 X |

WILLIAM W. DYER, Jr., *Primary Examiner.*

LEON PEAR, *Examiner.*